United States Patent
Unterforsthuber

(10) Patent No.: US 6,350,217 B1
(45) Date of Patent: Feb. 26, 2002

(54) METHOD FOR ESTABLISHING A DEFINED ACTIVE RELATIONSHIP BETWEEN THE OPERATION OF THE ACCELERATOR PEDAL AND THE RESULTING BRAKING TORQUE OF A VEHICLE

(75) Inventor: Jakob Unterforsthuber, Maisach (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 09/571,316

(22) Filed: May 15, 2000

(30) Foreign Application Priority Data

May 14, 1999 (DE) .......................................... 199 22 338

(51) Int. Cl.$^7$ .............................................. B60K 41/02
(52) U.S. Cl. ...................................... 477/174; 477/183
(58) Field of Search ................................ 123/319, 320, 123/321, 334, 345, 347; 477/183, 182, 166, 174

(56) References Cited

U.S. PATENT DOCUMENTS

| | | | |
|---|---|---|---|
| 4,146,108 A | 3/1979 | Sato | 108/103 BF |
| 4,262,783 A | 4/1981 | Scarrott et al. | 192/9 |
| 4,787,205 A | 11/1988 | Fontaine | 60/547.1 |
| 4,871,215 A | 10/1989 | Takayama | 303/100 |
| 5,630,773 A * | 5/1997 | Slicker et al. | 477/176 |
| 6,171,213 B1 * | 1/2001 | Kosik et al. | 477/86 |
| 6,217,469 B1 * | 4/2001 | Sawada et al. | 474/28 |

FOREIGN PATENT DOCUMENTS

| | | |
|---|---|---|
| DE | 43 05 737 | 3/1994 |
| DE | 196 25 502 | 11/1997 |
| EP | 0 363 634 | 4/1990 |
| EP | 0 819 591 | 1/1998 |

* cited by examiner

*Primary Examiner*—Dirk Wright
(74) *Attorney, Agent, or Firm*—Crowell & Moring LLP

(57) ABSTRACT

A method for establishing a defined active relationship between the operation of the accelerator pedal and the resulting braking torque of a vehicle is provided, in which the possible adjusting range of the accelerator pedal is divided into at least two control ranges. A first control range is defined below a first defined accelerator pedal angle. In the first control range, control elements which can cause a deceleration of the vehicle are controlled corresponding to a defined braking torque course. Preferably, the second control range is defined above a second defined accelerator pedal angle. Between the first and the second defined accelerator pedal angle, a third control range is defined, in which the control elements which can cause a deceleration or an acceleration are controlled such that the braking torque or the drive torque of the vehicle is, in each case, kept constant.

4 Claims, 3 Drawing Sheets

METHOD FOR ESTABLISHING A DEFINED ACTIVE RELATIONSHIP BETWEEN THE OPERATION OF THE ACCELERATOR PEDAL AND THE RESULTING BRAKING TORQUE OF A VEHICLE

BACKGROUND AND SUMMARY OF THE INVENTION

This application claims the priority of German Application No. 199 22 338.6, filed May 14, 1999, the disclosure of which is expressly incorporated by reference herein.

The invention relates to a method for establishing a defined active relationship between the operation of the accelerator pedal and the resulting braking torque of a vehicle.

The driving power of today's vehicles is normally controlled by means of the accelerator pedal. When the accelerator pedal is continuously operated starting from the zero position, the drive torque of the engine (in the form of an internal combustion engine) is correspondingly continuously increased in that the control element responsible for the drive, such as the throttle valve in the case of Otto engines, is controlled. In the zero position itself of the accelerator pedal, no drive torque is transmitted; that is, the engine changes into the coasting operation, whereby a so-called engine drag torque is caused.

FIG. 4 illustrates a possible accelerator pedal characteristic according to the current state of production. In this connection, FIG. 4 shows a characteristic drive torque curve 1, which is obtained in the case of a low engaged gear, and a characteristic drive torque curve 2, which occurs when a high gear is engaged, as a function of the accelerator pedal angle W (abscissa). The accelerator pedal angle W may, for example, have an adjusting range of 0° to 18°. The drive torque is entered on the ordinate in FIG. 4, the decelerating torque $M_v$, (braking torque, negative drive torque) being illustrated below the zero line and the accelerating torque $M_B$ (positive drive torque) being illustrated above the zero line. In the zero position of the accelerator pedal, that is, $W \leq 0°$, different braking torques occur automatically and abruptly, particularly as a function of the engaged gear and of the engine drag torque: $M_v = M_1$ for the characteristic drive torque curve 1, and $M_v = M_2$ for the characteristic drive torque curve 2; that is, the braking torque $M_1$ in the low gear is considerably larger than the braking torque $M_2$ in the high gear.

In the case of this type of drive control, the driver has no influence by way of the accelerator pedal on the deceleration occurring in the zero position. It occurs automatically from the momentarily existing drag torque of the engine (such as an Otto engine or a Diesel engine). The drag torque, in turn, is also a function of a plurality of factors, as, for example, of the rotational engine speed, of the vehicle speed, of the engaged gear, of the displacement and/or of the transmission type (for example, a manual transmission or an automatic transmission).

FIG. 5 schematically shows the resulting drive torques (or braking torques) in the form of acceleration a (or deceleration) as a function of the respective engaged gear and of the momentary vehicle speed v in the case of a vehicle having a manual transmission according to the state of the art.

In particular, the higher the vehicle deceleration when the accelerator pedal is released, the easier it is to drive in a line of vehicles. This deceleration is composed of the inherent deceleration (aerodynamic drag, rolling resistance) and of the deceleration resulting from the engine drag torque.

Although the use of low gear positions and high rotational speeds makes driving in a line of vehicles easier and more comfortable, it represents the opposite of a low-consumption driving method and is also connected with noise emissions and engine wear. A driver who is concerned about consumption will use a high gear, if possible. Particularly when driving in a line, a high gear and thus a low drag torque is a disadvantage because, for the adaptation of one's own vehicle speed to the speed of the vehicle driving ahead, frequent braking must take place which reduces comfort. In order to avoid such braking, the driver often allows his own vehicle to roll closer to the vehicle driving ahead than a safe distance would allow.

It is an object of the invention to improve an accelerator pedal characteristic of the above-mentioned type such that the above-mentioned disadvantages are avoided. Particularly, comfort, safety and fuel consumption of the vehicle are to be improved.

The simplifying term "accelerator pedal characteristic" is a method by which a defined active relationship between the operation of the accelerator pedal and the resulting drive torque or braking torque of the vehicle is established.

With respect to a method for establishing a defined active relationship between the operation of the accelerator pedal and the resulting braking torque of a vehicle, according to the invention, the possible adjusting range of the accelerator pedal is divided into at least two control ranges. In the first control range below a first defined accelerator pedal angle, control elements, which can cause a deceleration of the vehicle, are controlled corresponding to a defined braking torque course.

In principle, in a second control range above a second accelerator pedal angle, which may be equal to the first accelerator pedal angle or larger than the first accelerator pedal angle, the engine torque and/or the drive torque is controlled in the customary manner. However, this second control range itself is not the object of the invention.

In a further development of the invention, in a third control range between the first and the second defined accelerator pedal angles, the control elements, which can cause a deceleration and an acceleration, are controlled such that the braking torque or the drive torque of the vehicle is held constant at the value which exists when an accelerator pedal angle is reached in the third control range. In this case, the invention is based on the fact that a range is assigned to the driver in which he desires neither a drive nor a deceleration, and which is not defined to be so small that a back and forth swinging can take place between the drive and the deceleration.

The invention is ideal in combination with control elements (16, see FIG. 6) of systems that can influence the drag torque of the engine in a targeted manner. In the first control range, when the first defined accelerator pedal angle mentioned above is reached, or in the third control range, when the second defined accelerator angle mentioned above is reached, for example, the drag torque is reduced as far as possible in order to utilize the kinematic energy of the vehicle as long as possible. When the accelerator pedal is moved in the deceleration direction, that is, in the case of a further decrease of the accelerator pedal angle below the first defined accelerator pedal angle, the drag torque is increased continuously. Control elements 16, which permit such a drag torque control, are, for example, electrically controllable valves of EVT systems (EVT=electrically variable valve gear), in the case of which the valves can be arbitrarily closed, or control elements of a crankshaft starter generator (KSG).

Additional control elements 16 which can cause a deceleration of the vehicle are, in connection with the accelerator pedal characteristic according to the invention, for example, components of wheel brake control systems for active braking interventions independent of the operation of the brake pedal or components of electronically controlled automatic transmissions for an automating backshifting of the gears.

By means of the present invention, a plurality of advantages are achieved. Thus, for example, in the case of automatic vehicles, considerable comfort is gained in that, in the case of a driving in a queue, a change must not constantly take place between the accelerator pedal and the brake pedal. Safety is gained by maintaining a safe distance without experiencing fatigue. Nevertheless, in the case of manual transmission vehicles, a fuel-saving method of operation is permitted as the result of low rotational speeds and high gears. In conjunction with energy recuperation systems (for example, the crankshaft starter generator (KSG)), a considerable amount of fuel can be saved. A comfortable driving method, which does not require habituation and presents no problems, is achieved in connection with an engine stop, automatic clutches, one-way clutches and CVT transmissions.

Other objects, advantages and novel features of the present invention will become apparent from the following detailed description of the invention when considered in conjunction with the accompanying drawings.

DETAILED DESCRIPTION OF THE DRAWINGS

Figure 6:
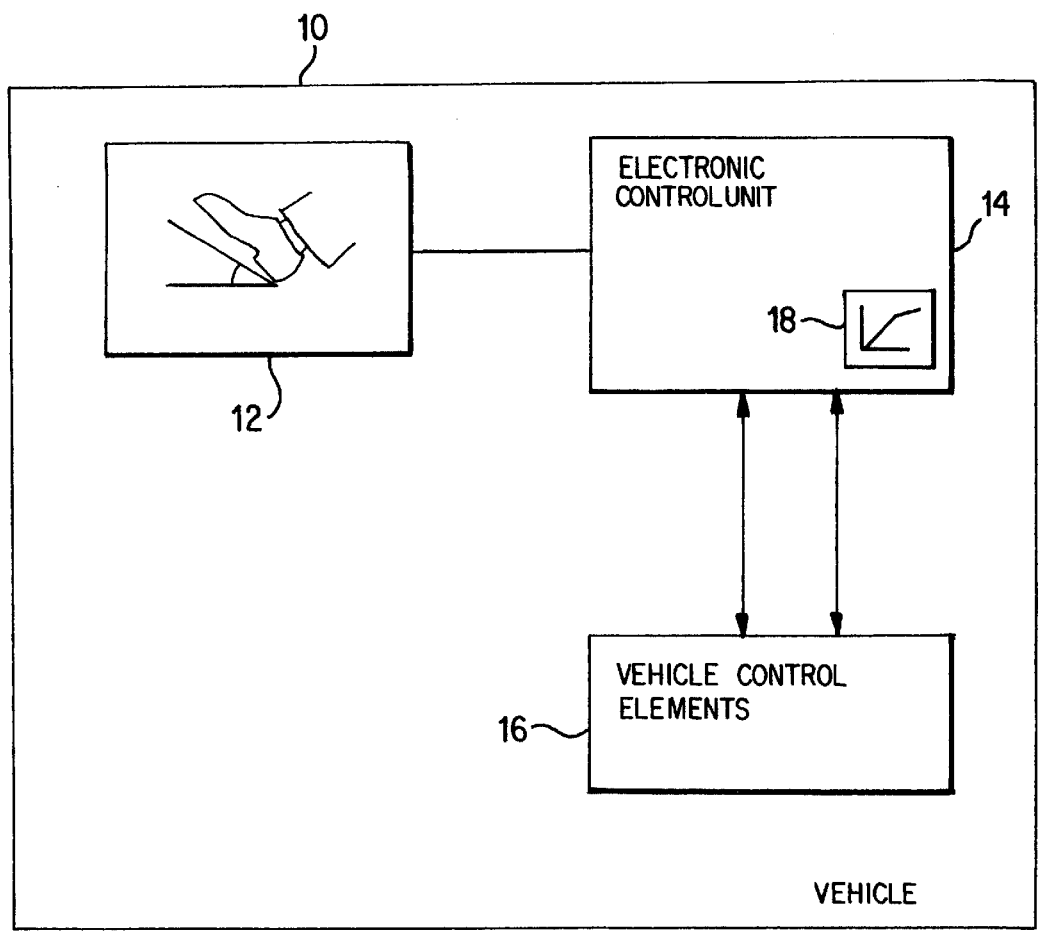
FIG. 6 is a schematic block diagram of a vehicle incorporating the method according to the present invention.

FIG. 6 is a schematic block diagram of a vehicle 10 in which the method according to the present invention can be practiced. The vehicle 10 includes an accelerator pedal 12 whose output is provided to an electronic control unit 14. The electronic control unit 14 controls various vehicle control elements 16 by which a deceleration and acceleration of the vehicle 10 are controlled. In accordance with the invention, the electronic control unit 14 controls the vehicle control elements 16 in accordance with a defined braking torque course 18 (see FIGS. 2 and 3) based on the adjusting range of the accelerator pedal 12 to establish a defined active relationship between the operation of the accelerator pedal and the resulting braking torque of the vehicle.

Figure 1:
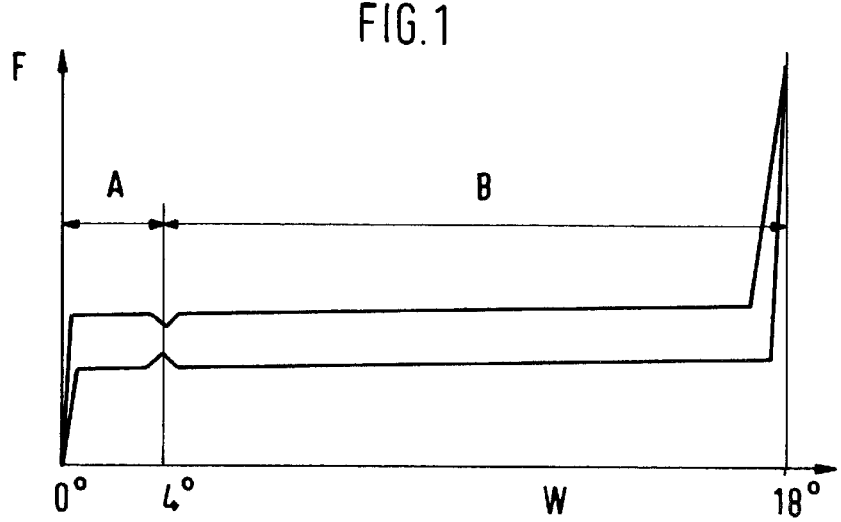
FIG. 1 is a graphical view of a possible characteristic accelerator pedal curve which is divided into two control ranges according to the invention.

FIG. 1 shows a possible characteristic accelerator pedal curve based on the accelerator pedal force F as function of the accelerator pedal angle W with the hysteresis relative to the course of the deceleration operation (upper curve) in contrast to the course of the acceleration operation (lower curve). With respect to the entire accelerator pedal angle range of, for example, 0° to 18°, the characteristic accelerator pedal curve is divided into two control ranges A and B. In this example (compare also FIG. 2), the first control range A is situated below a defined accelerator pedal angle W of 4°. The second control range B is situated above the same defined accelerator pedal angle. As a possible alternative (see also FIG. 3), the first control range A may be situated below a first accelerator pedal angle W, for example, 2°, and the second control range B may be situated above a second accelerator pedal angle W, such as 6°. As a result, a third control range C would be formed between the first and the second accelerator pedal angles W. The reaching of the first and/or second accelerator pedal angle W can be indicated to the driver preferably haptically.

An example of generating the characteristic accelerator pedal curve is described. In the course of the further development of the accelerator pedal systems, a corresponding characteristic curve could be fixedly installed on a mechanical basis. More favorable conditions are provided by the active accelerator pedal on which a fixed basic characteristic curve can be superimposed by way of a servo motor at the pedal with auxiliary forces. This so-called force feedback accelerator pedal offers a maximum of flexibility, in which case characteristic curves and hystereses can be freely designed and can be adapted in an event-oriented manner.

Figure 2:
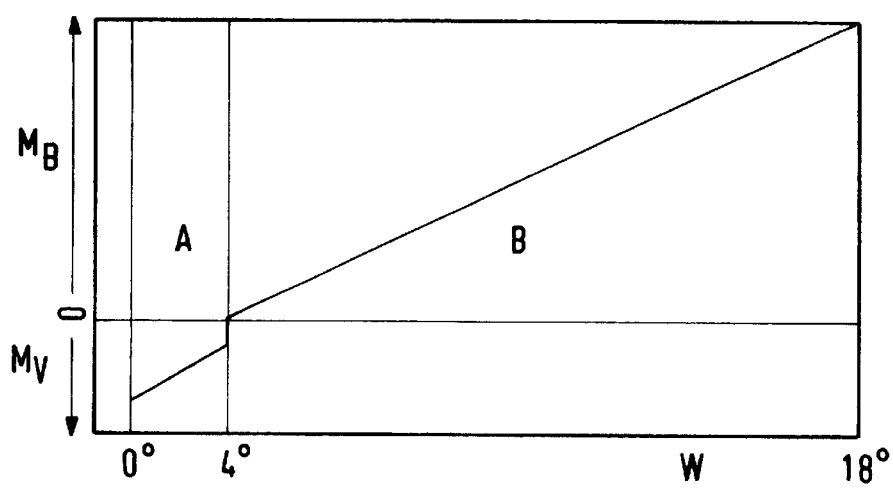
FIG. 2 is a graphical view of a first accelerator pedal characteristic according to the invention.
Figure 3:
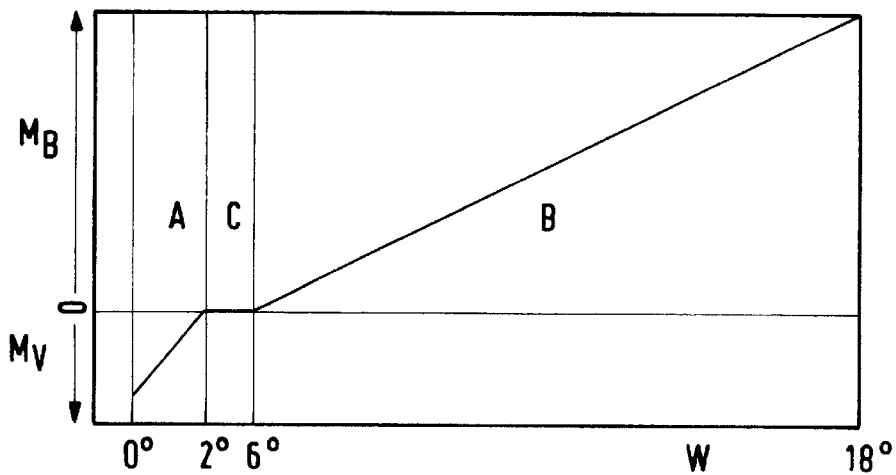
FIG. 3 is a graphical view of a second accelerator pedal characteristic according to the invention.
Figure 4:
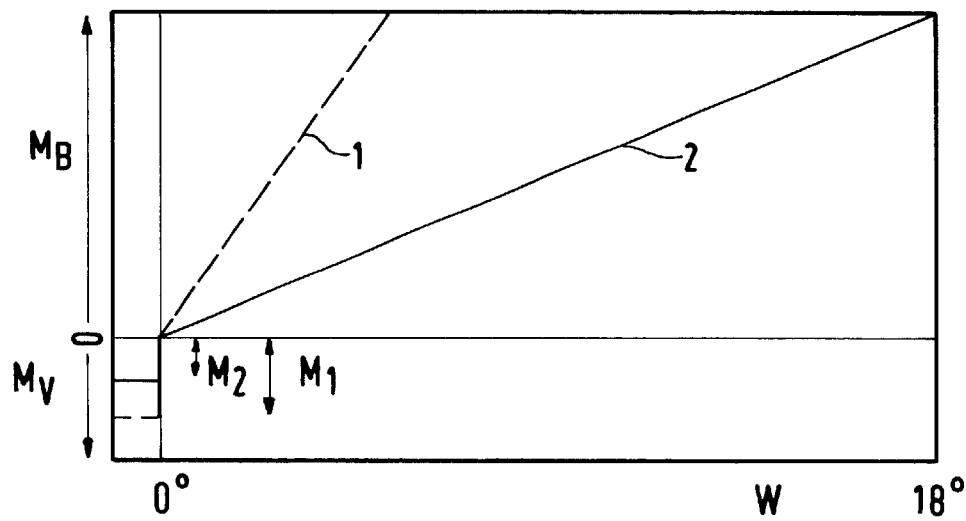
FIGS. 4 and 5 are graphical views of conventional systems.
Figure 5:
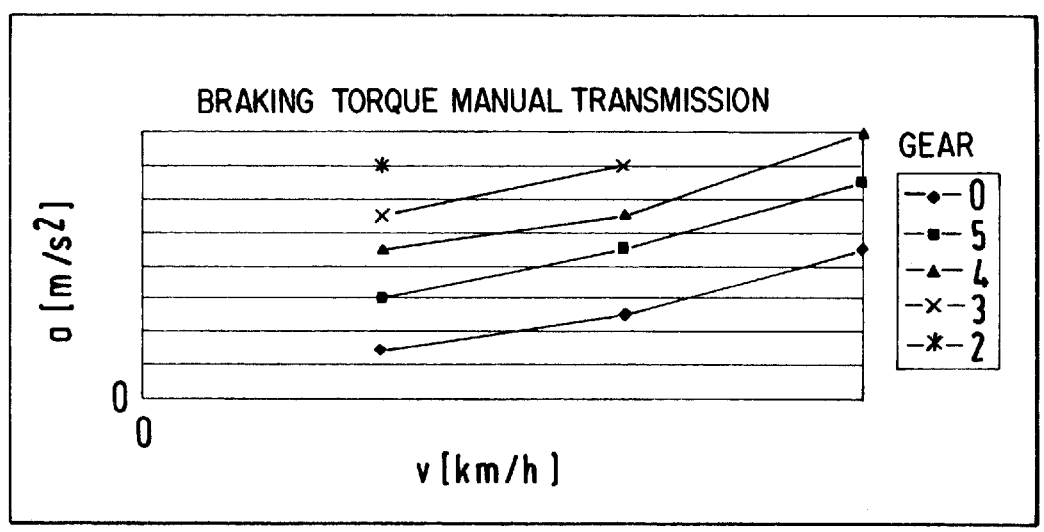

FIGS. 2 and 3 show, as a function of the two or three defined control ranges A, B and optionally C, possible accelerator pedal characteristics according to the invention in the form of drive torques or braking torques M as a function of the accelerator pedal angle W.

In the two FIGS. 2 and 3, the drive torque M is controlled in a conventional manner in the second control range B (drive range). In the first control range A (braking range), a defined deceleration or a defined braking torque course is built up. The amount of the controllable deceleration should preferably not exceed the inherent deceleration occurring at high rotational speeds.

FIG. 3 shows a third control range C as an alternative to FIG. 2. In this control range C, the drive torque M is held constant at the value which exists just when the third control range is reached starting from control range A or starting from control range B relative to the accelerator pedal angle W.

In further developments of the invention (not shown here), the defined braking torque course in control range A may have any arbitrary form rising in the direction of the increasing accelerator pedal angle W and, also when a control range C is absent, in contrast to FIG. 2, change continuously into the drive torque course of control range B.

For reaching the defined deceleration or the defined (negative) drive torque course (braking torque course) in control range A (FIG. 2 and FIG. 3), in the electronic control unit 14 (for example, the engine control unit), which preferably exists anyhow, the actual deceleration is compared with the desired deceleration assigned to the respective accelerator pedal angle W. As required, certain measures are taken via the vehicle control elements 16 in order to compensate the control deviation. Such measures are, for example, a brake intervention by way of an electronic wheel brake control system, the backshifting in the case of vehicles with an automatic transmission, an increase of the drag torque in the case of engines with a variable valve gear (EVT) or a generating of the drag torque by means of a crankshaft starter generator (KSG).

For example, in the case of vehicles having an automatic clutch, for generating the required braking torque, the engaging of the clutch takes place in a metered manner. The slip can be controlled such that the actual braking torque corresponds to the desired braking torque. If the braking torque by means of the automatic clutch is not sufficient, the difference is compensated, for example, by a braking intervention from the wheel brake control system.

Excellent conditions are provided by the use of a CVT transmission because, by means of it, the braking torque can very easily be controlled by changing the transmission ratio. This alone already results in a considerable savings of consumption which can still be increased by using an automatic clutch or, for example, a shiftable one-way clutch.

In the case of vehicles with crankshaft starter generators (KSG), the KSG drive torque is superimposed on the engine torque. When the braking effect of the KSG is not sufficient, the braking torque is supplemented by the engine braking torque or by means of the wheel brakes to the desired overall braking torque.

An ideal basis for the implementation of the invention is a fully variable valve timing gear. This can considerably influence the engine drag torque in the coasting operation. Closed valves result in a very low drag torque. An outlet valve which opens up shortly before the top dead center (TDC) of the cylinders causes a high drag torque. Mainly the lowering of the drag torque clearly below current levels results in the chance to considerably reduce consumption, also without using a one-way clutch and without using an automatic clutch.

In the case of today's vehicles, the inherent deceleration fluctuates as a rule between 0.2 m/s² (freely rolling vehicle) and 1 m/s² at high rotational engine speeds. For example, 1 m/s² can be set as a limit value for an inherent deceleration to be applied by the driver in a metered manner by way of the accelerator pedal. This would be within the range customary today. However, clearly higher values of up to approximately 2 m/s² are also contemplated.

According to the invention, the driver is therefore permitted to influence the vehicle deceleration by means of the accelerator pedal. In the case of the current accelerator pedal design, it is only possible to drive by way of the engine or to enter coasting switch-off via the engine. The transition from one operating condition to the other takes place abruptly and cannot be metered. By dividing the accelerator pedal characteristic into two ranges, the driver is permitted to control not only the drive torque but also the deceleration up to a defined threshold.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for establishing a defined active relationship between an operation of an accelerator pedal and a resulting braking torque of a vehicle, the method comprising the acts of:

dividing a possible adjusting range of the accelerator pedal into at least two control ranges, wherein a first control range is defined below a first defined accelerator pedal angle; and in the first control range, controlling vehicle control elements operatively coupled to cause a deceleration of the vehicle in accordance with a defined braking torque course.

2. The method according to claim 1, wherein a second of said at least two control ranges is defined above a second defined accelerator pedal angle so as to define a third control range between the first and second defined accelerator pedal angles, the method further comprising the act of:

controlling the vehicle control elements when in the third control range to cause a deceleration or acceleration of the vehicle such that the braking torque or drive torque of the vehicle is maintained constant.

3. A characteristic drive torque curve in relation to a defined adjusting range of an accelerator pedal for use with a motor vehicle, comprising:

a first negative drive torque range having a defined course extending between a substantially lower end of the defined adjusting range to a first defined accelerator pedal angle; and a second positive drive torque curve extending from the first defined accelerator pedal angle in a conventional manner to an upper end of the defined adjusting range.

4. The characteristic drive torque curve according to claim 3, further comprising a third zero drive torque range in between said first and second drive torque ranges, wherein the negative and positive drive torques of the vehicle are maintained constant.

* * * * *